United States Patent
Blumenau (10) Patent No.: US 10,169,058 B2
(45) Date of Patent: Jan. 1, 2019

(54) SCRIPTING LANGUAGE FOR ROBOTIC STORAGE AND RETRIEVAL DESIGN FOR WAREHOUSES

(71) Applicant: Voodoo Robotics, Inc., Plano, TX (US)

(72) Inventor: Trevor I. Blumenau, Plano, TX (US)

( * ) Notice: Subject to any disclaimer, the term of this patent is extended or adjusted under 35 U.S.C. 154(b) by 497 days.

(21) Appl. No.: 14/864,494

(22) Filed: Sep. 24, 2015

(65) Prior Publication Data
US 2017/0090874 A1    Mar. 30, 2017

(51) Int. Cl.
*G06F 8/41* (2018.01)
*G06F 8/60* (2018.01)
*G06F 9/455* (2018.01)

(52) U.S. Cl.
CPC ............ *G06F 9/45512* (2013.01); *G06F 8/41* (2013.01); *G06F 8/427* (2013.01); *G06F 8/60* (2013.01)

(58) Field of Classification Search
CPC .......... G06F 8/60; G06F 9/45512; G06F 8/41; G06F 8/427
USPC ................................................. 717/114, 115
See application file for complete search history.

(56) References Cited

U.S. PATENT DOCUMENTS

| | | | | |
|---|---|---|---|---|
| 6,754,647 B1 * | 6/2004 | Tackett | ................. | G06F 17/279 700/246 |
| 7,886,273 B2 * | 2/2011 | Hinchey | .................... | G06F 8/10 717/124 |
| 8,386,078 B1 * | 2/2013 | Hickman | .......... | G06F 17/30194 318/568.1 |
| 8,639,644 B1 * | 1/2014 | Hickman | ............... | G06N 3/008 700/245 |
| 9,908,701 B2 * | 3/2018 | Blumenau | ............... | B65G 1/137 |
| 2009/0112927 A1 * | 4/2009 | Chitnis | ................ | G06Q 10/087 |
| 2012/0283868 A1 * | 11/2012 | Rutt | ..................... | G06Q 10/043 700/217 |
| 2013/0317642 A1 * | 11/2013 | Asaria | .................... | G06Q 50/28 700/216 |

(Continued)

*Primary Examiner* — Marina Lee
(74) *Attorney, Agent, or Firm* — John Lindsay (57) ABSTRACT

The present invention is directed to systems and methods for design and operation of a robotic storage and retrieval system in a warehouse. An exemplary system includes a processor and memory operable to provide a scripting language framework for directed operation of a control system of the robotic storage and retrieval system. The scripting language framework provides a shelving descriptor and a robot descriptor. The shelving descriptor is operable to model shelving to be deployed in the warehouse, the shelving descriptor further having associated shelving attributes defining properties of the shelving descriptor. The robot descriptor is operable to model a robot to be deployed in the warehouse, the robot descriptor further having associated robot attributes defining properties of the robot descriptor. A provided scripting editor includes a user interface operable to receive input scripting language code conforming to said scripting language framework and based on warehouse metadata. A provided parser is operable to interpret or compile input scripting language code into a runtime system. The runtime system is configured to issue control operations to a robot in the warehouse and is communicatively interposed between the robot and a control system of the robotic storage and retrieval system.

20 Claims, 10 Drawing Sheets

(56) References Cited

U.S. PATENT DOCUMENTS

| | | | |
|---|---|---|---|
| 2014/0060770 A1* | 3/2014 | Blumenau | B22D 33/00 164/154.1 |
| 2014/0222191 A1* | 8/2014 | Blumenau | B22D 33/00 700/218 |
| 2014/0310231 A1* | 10/2014 | Sampathkumaran | G06F 17/30563 707/602 |
| 2016/0167228 A1* | 6/2016 | Wellman | B25J 9/1612 700/218 |
| 2017/0090874 A1* | 3/2017 | Blumenau | G06F 9/45512 |
| 2018/0068258 A1* | 3/2018 | Blumenau | G06Q 10/0875 |
| 2018/0068268 A1* | 3/2018 | Blumenau | G06Q 10/0875 |

* cited by examiner

38
| Warehouse Metadata |
|---|
| ○Warehouse Identifier<br>○X axis (axes) width(s)<br>○Y axis (axes) length(s)<br>○Z axis (axes) height(s)<br>○Inventory Type(s)<br>○Inventory Dimension(s)<br>○Inventory Weight(s) |

42
| Shelving Rack |
|---|
| 43 •Level(s)<br>○Column(s)<br>○Width(s)<br>○Height(s)<br>○Compartment Identifier<br>○Comparment Position<br>○Compartment Dimension(s)<br>○Compartment Offset(s) |

46
| Robot |
|---|
| 47 ○Associated Shelves<br>•X axis minimum position<br>○X axis maximum position<br>○Y axis minimum position<br>○Y axis maximum position<br>○Z axis minimum position<br>○Z axis maximum position |

Fig. 5

```
                                                                                    34
    ┌─────────────────────────────────────────────────────────────────────┐
    │  $xOffset = 0.1;                                                    │
    │  $zOffset = 0.3;                                                    │
43  │  $numRows = 10;                                                     │
    │  $numColumns = 5;                                                   │
    │  $zOffGround = 0.1;                                                 │
    │                                                                     │
    │  $margins['pickup']['under'] = 0.01;                                │
    │  $margins['pickup']['over'] = 0.01;                                 │
43  │  $margins['dropoff']['over'] = 0.01;                                │
    │  $margins['dropoff']['under'] = 0.01;                               │
    │                                                                     │
    │  list($rsize['x'],$rsize['y'],$rsize['z']) = array($size['x'],0.06, │
    │  $numColumns*($size['z']+$zOffset)+$zOffGround);                    │
    │                                                                     │
46  │  $robot1 = "Robot1";                                                │
    │  $robotY1 = 0;                                                      │
    │                                                                     │
    │  $xform = array(                                                    │
    │     array(1,0,0,0),                                                 │
    │  array(0,1,0,$robotY1),                                             │
    │     array(0,0,1,0),                                                 │
    │     array(0,0,0,1)                                                  │
    │  );                                                                 │
47  │  $parms = array( 'robotSize' => $rsize, 'carrySize' => $size, 'transform' => $xform, 'carryShape' => $shape, │
    │  'simulate' => true, );                                             │
    │                                                                     │
46  │  $r1 = defineRobot($robot1,$parms);                                 │
    │                                                                     │
47  │  $aisle = "Robot1-Left";                                            │
    │  $location['y'] = $robotY1+$size['y']+$xOffset;                     │
    │                                                                     │
    │  $access = array();                                                 │
47  │  $access['front'][$r1]['x'] = 0;                                    │
    │  $access['front'][$r1]['y'] = +$size['y']/2;                        │
    │  $access['front'][$r1]['z'] = -$size['z']/2;                        │
    │                                                                     │
    │  for ($stack = 0; $stack < $numRows; $stack++) {                    │
43  │  $location['x'] = $stack * ($size['x']+$xOffset) + $size['x']/2;    │
    │     $location['z'] = $zOffGround + $size['z']/2;                    │
    │     for ($row = 0; $row < $numColumns; $row++) {                    │
    │                                                                     │
    │  $parms = array(                                                    │
    │  'size' => $size,                                                   │
    │  'shape' => $shape,                                                 │
43  │  'aisle' => $aisle,                                                 │
    │  'location' => $location,                                           │
    │  'margins' => $margins,                                             │
    │  'sizeClass' => 0,                                                  │
    │  );                                                                 │
    │        defineSlot("$aisle:shelf$stack:row$row",$parms);             │
    │        $location['z'] += $size['z']+$zOffset;                       │
    │     }                                                               │
    │  }                                                                  │
    └─────────────────────────────────────────────────────────────────────┘
```

Fig. 6

Fig. 7

SCRIPTING LANGUAGE FOR ROBOTIC STORAGE AND RETRIEVAL DESIGN FOR WAREHOUSES

FIELD OF THE INVENTION

The invention relates generally to robotic storage and retrieval systems and methods, and more particularly, to systems and methods for providing a scripting language for design of robotic storage and retrieval systems for a particular warehouse.

BACKGROUND

In many industrial environments, such as warehouses, robots are used for storage and retrieval of items. In warehouses, customized shelving racks are designed and constructed for storage of items. The shelving racks typically have multiple vertical levels. Each vertical level typically is divided horizontally to provide individual, compartmentalized storage slots into which items, such as pallets, are stored. The robots, also designed and constructed for that particular warehouse shelving rack environment, move both vertically and horizontally between the shelving racks, place the pallets in the shelving racks for storage and also pick up and carry the items away from the shelving racks during retrieval.

Original design or changes to the items, volume of items, size of items, shelving racks, compartments, levels, pallets, robots, functionality, or warehouse workflow can require substantial design, redesign, construction, and/or retraining. This invention addresses these and other issues.

SUMMARY

The present invention is directed to systems and methods for design and operation of a robotic storage and retrieval system in a particular warehouse. An exemplary system comprises a processor and memory operable to provide a scripting language framework for directed operation of a control system of the robotic storage and retrieval system. The scripting language framework provides a shelving descriptor and a robot descriptor. The shelving descriptor is operable to model shelving to be deployed in the warehouse, the shelving descriptor further having associated shelving attributes defining properties of the shelving descriptor. The robot descriptor is operable to model a robot to be deployed in the warehouse, the robot descriptor further having associated robot attributes defining properties of the robot descriptor. A provided scripting editor comprises a user interface operable to receive input scripting language code conforming to said scripting language framework and based on warehouse metadata. A provided parser is operable to interpret or compile input scripting language code into a runtime system. The runtime system is configured to issue control operations to a robot in the warehouse and is communicatively interposed between the robot and a control system of the robotic storage and retrieval system.

These and other features, aspects, and advantages of the invention will become better understood with reference to the following description, appended claims, and accompanying drawings.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
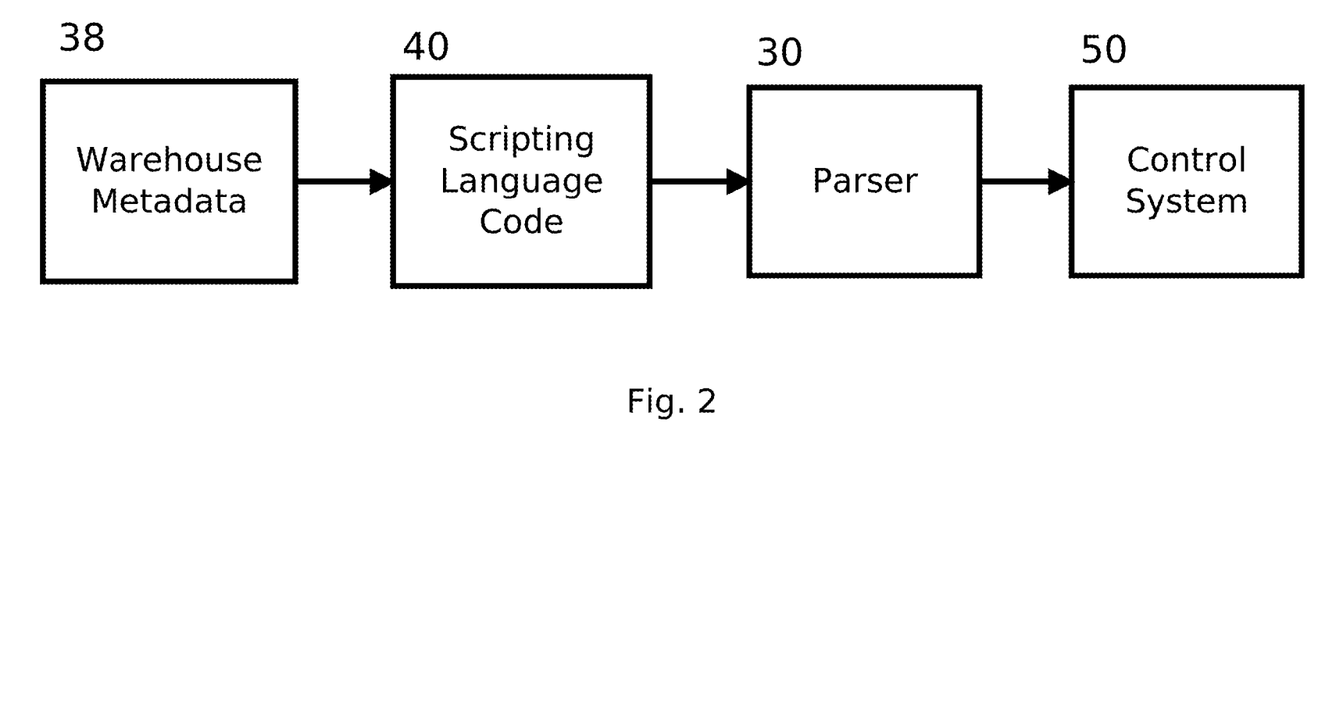
FIG. 2 shows a block diagram of an embodiment of a system according to the current invention.

The current invention is directed to systems and methods of providing a scripting language for robotic storage and retrieval system design and operation for warehouses, facilitating design, simulation, and changes to the robotic storage and retrieval system. This disclosure generally describes computer systems, software, and computer implemented methods for providing a scripting language for design and operation of robotic storage and retrieval system design and operation for warehouses. A computer program product may be encoded on a tangible storage medium where the product comprises computer readable instructions for causing processors to perform operations. As shown in FIG. 2, warehouse metadata 38 is employed as a basis for scripting language code 40. A parser 30 processes the input scripting language code 40 in order to initialize and operate a control system 50 for a robotic storage and retrieval design and operation for the particular warehouse.

Figure 1:
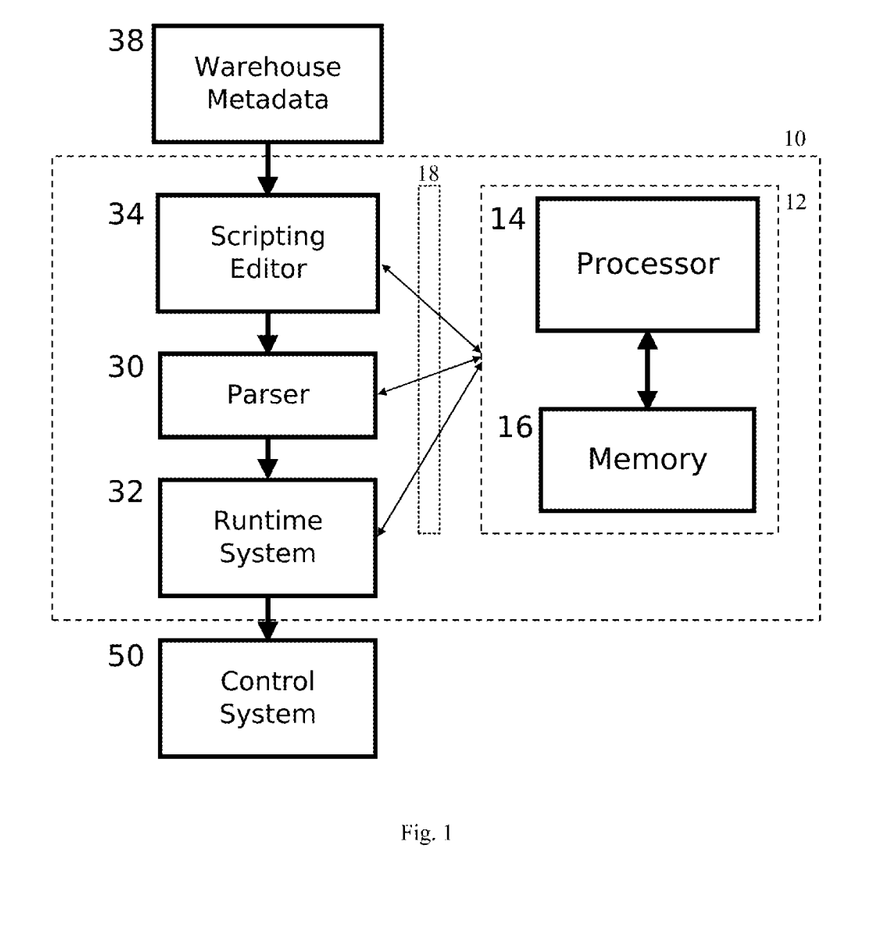
FIG. 1 shows a diagram of an embodiment of a system according to the current invention.

FIG. 1 depicts a block diagram of an embodiment of a system according to the current invention. Warehouse metadata 38 for a particular warehouse is employed as a partial basis for scripting language code input. The depicted system 10 provides a scripting language editor 34 for receipt of scripting language code 40 based, in part, on the warehouse metadata 38. The scripting language code input 40 is processed by a parser 30. A runtime system 32 interprets or compiles the received scripting language code 40 in order to initialize and operate a control system 50 for the robotic storage and retrieval systems of the particular warehouse.

Exemplary embodiments of the systems of the current invention are implemented on a computer 12, specifically a server 12. As used in the present disclosure, the term "computer" is intended to encompass any suitable processing device. For example, although FIG. 1 illustrates a single server 12, the environment may be implemented using one or more servers 12, as well as computers other than servers 12, including a server pool. Indeed, a server and client system may be any computer or processing device such as, for example, a blade server, general-purpose personal computer (PC), Macintosh, workstation, UNIX-based workstation, personal digital assistant (PDA), mobile phone, palmtop computer, tablet, or any other suitable device. In other words, the present disclosure contemplates computers other than general purpose computers, as well as computers without conventional operating systems. Further, illustrated server 12 and scripting editor 34 may be adapted to execute various operating systems, including Linux, UNIX, Windows, Mac OS, or other suitable operating system.

Server 12 is one that stores one or more applications, where at least a portion of the applications may be hosted applications executed via requests and responses sent to users or clients and communicably coupled to the illustrated environment of FIG. 1. In some instances, the server 12 may comprise a web server or be communicably coupled with a web server accessed and operated over network 18 by scripting editor 34 and control system 50 of the environment to perform the programmed tasks and operations.

In general, server 12 also includes memory 16 for storing data and program instructions. Memory 16 may include any memory or database and may take the form of volatile or non-volatile memory including, without limitation, magnetic media, optical media, random access memory (RAM), read-only memory (ROM), removable media, or any other suitable local or remote memory component. Memory 16 may store various objects or data, including source code, object code, the scripting framework, classes, applications, jobs, databases, repositories storing inventory, shelving, robotics information, and any other appropriate information including any parameters, variables, algorithms, instructions, rules, constraints, or references thereto associated with the purposes of server 12.

In certain configurations, the system 10 includes specialized storage in the form of a database configured to store shelving environment configuration data. In exemplary configuration, shelving content data, inventory data, user data, and robotic carriage queue data, and robotic carriage historical data associated with a specific operating environment are received. One skilled in the art would appreciated that the data may reside in one or more databases, tables, or computers. Representative suitable database systems include MySQL, PostgreSQL, SQLite, Microsoft SQL Server, Oracle, or dBASE.

Network 18 may also include one or more local area networks (LANs), wide area networks (WANs), all or a portion of the Internet, and/or any other communication system or systems at one or more locations. Network 18 may be all or a portion of an enterprise or secured network, while in another instance at least a portion of the network 112 may represent a connection to the Internet. Further, all or a portion of network 112 may comprise either a wireline or wireless link. In other words, network 112 encompasses any internal or external network, networks, sub-network, or combination thereof operable to facilitate communications between various computing components inside and outside the illustrated environment. The network 112 may communicate, for example, Internet Protocol (IP) packets, Frame Relay frames, Asynchronous Transfer Mode (ATM) cells, voice, video, data, and other suitable information between network addresses.

In exemplary implementations, the system 10 includes a scripting editor 34 in the form of a graphical user interface (GUI) enabling input of scripting code modified by warehouse metadata 38 within the provided scripting language framework 36. As used in this disclosure, the scripting editor 34 may be presented on a personal computer, touch screen terminal, workstation, network computer, smart phone, personal data assistant, one or more processors within these or other devices, or any other suitable processing device. For example, a personal computer that includes an input device, such as a keypad, touch screen, mouse, or other device that can accept user information, and an output device that conveys information associated with the operation of the server 12 is suitable for interaction with the scripting editor 34.

The GUI comprises a graphical user interface operable to, for example, allow the user to interface with at least a portion of the platform for any suitable purpose, such as creating, preparing, requesting, or analyzing scripting code of the provided scripting framework. The GUI may comprise a plurality of configurable customizable frames or views having interactive fields, pull-down lists, and buttons operated by the user. For example, GUI may provide interactive elements that allow a user to select from a list of commands, descriptors, or attributes for input into a data field displayed in GUI. The GUI contemplates any suitable graphical user interface, such as a combination of a text interface, web browser, and command line interface that processes information in the platform and efficiently presents the results to the user visually.

Figure 5:
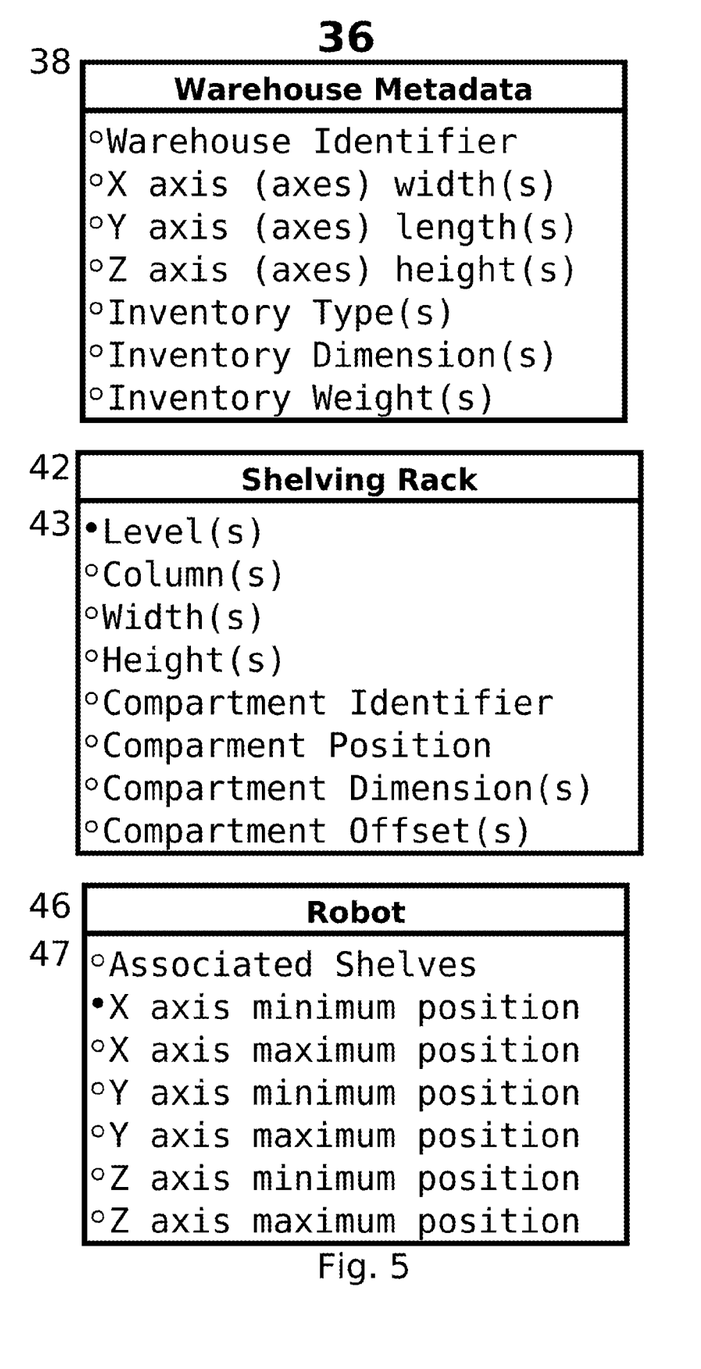
FIG. 5 shows representative descriptors and attributes employed in an embodiment of the scripting language framework of the current invention.

The system 10 provides a scripting language framework 36 in order to facilitate design and operation of an application for robotic storage and retrieval system for a particular warehouse 08, effectively modeling the robotic storage and retrieval system for the particular warehouse 08. At a high level, each of the one or more applications is any application, program, module, process, or other software that may execute, represent, generate, or otherwise manage design and retrieve information for a warehouse 08, particularly in response to and in connection with the robotic storage and retrieval of inventory for the warehouse. In certain cases, only one application may be located at a particular server 12. In others, a plurality of related and/or applications may be stored at a single server 12, or located across a plurality of other servers 12, as well. Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, PHP, parametric modeling language, assembler, as well as other languages. It should be understood that while portions of the software illustrated in FIG. 5 are shown as individual descriptors and attributes that model the various features and functionality through various objects, properties, methods, or other processes, the software may instead include a number of sub-modules, third party services, components, libraries, and such, as appropriate. Conversely, the features and functionality of various components may be combined into single components as appropriate. In the illustrated environment, computer 12 parses and executes the input scripting language code 40. In exemplary configuration, the scripting language framework 36 provides shelving descriptor 42 and shelving attributes 43, modeling the shelves 44 of a particular warehouse 08 environment, based on the warehouse metadata 38 of the particular warehouse 08 environment. In exemplary configuration, the scripting language framework 36 provides robot descriptor 46 and robot attributes 47, modeling the robots 44 of a particular warehouse 08 environment, again based on the warehouse metadata 38 of the particular warehouse 08 environment.

Figure 4A:
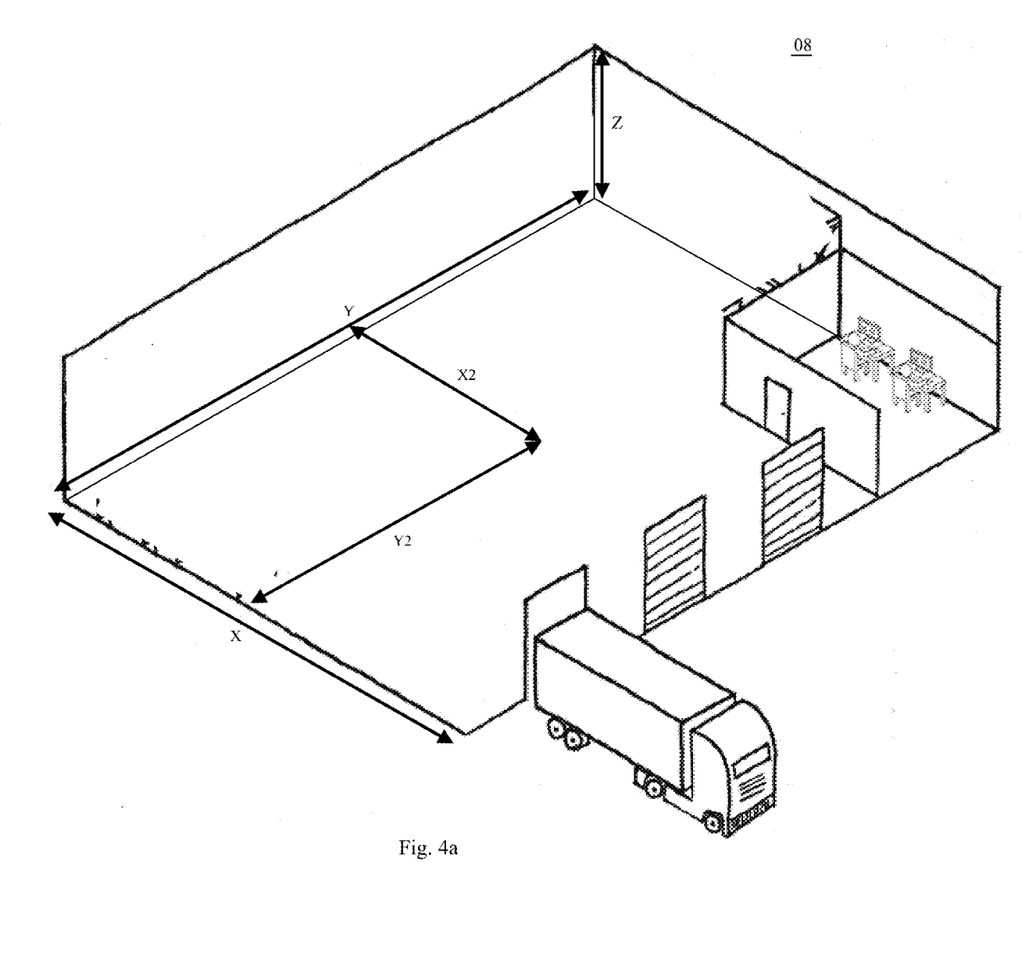
FIG. 4a shows a representative warehouse prior to application of the scripting language of the current invention.
Figure 4B:
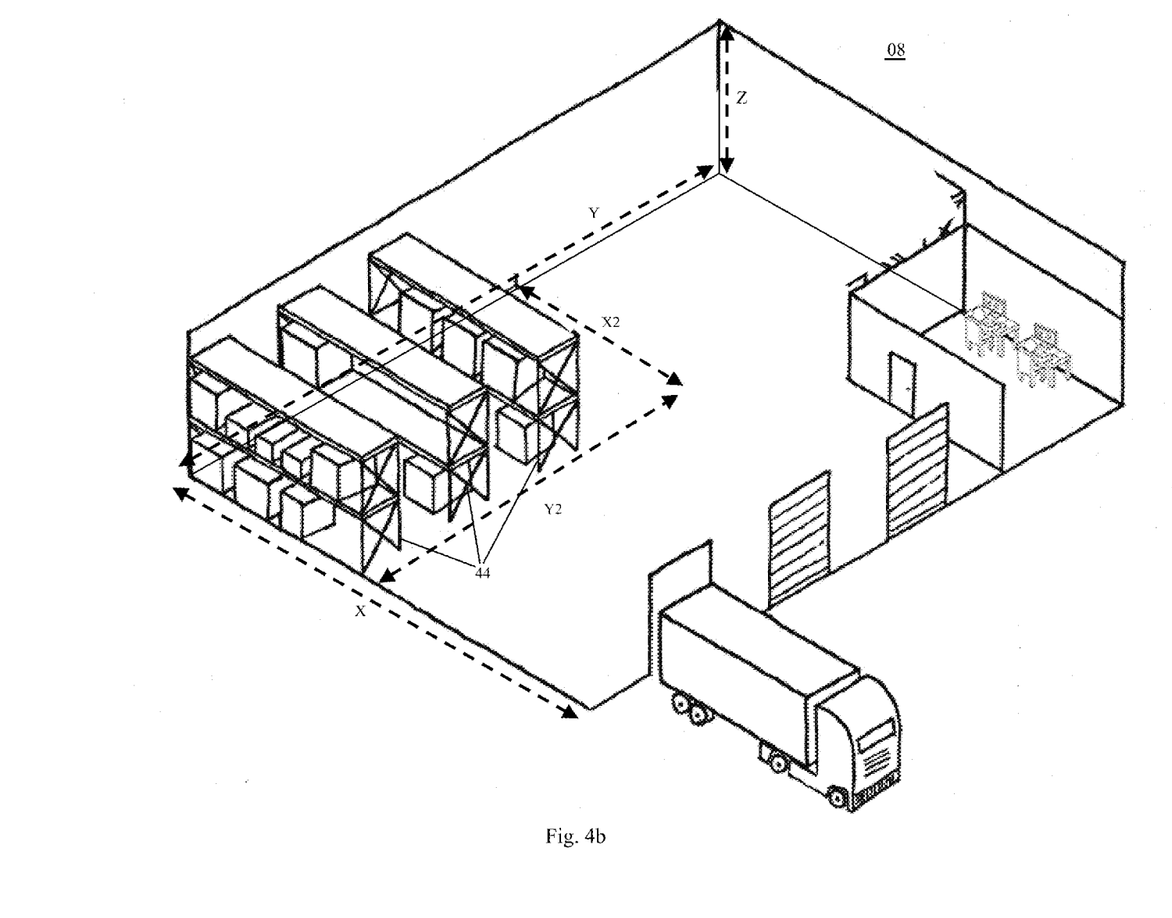
FIG. 4b shows a representative warehouse subsequent to application of the scripting language of the current invention and implementation of shelving and robotic systems.

Warehouse metadata 38 is employed as a partial basis for the input scripting language code 40. The warehouse metadata 38 includes data such as the dimensions of the warehouse 08 where the robotic storage and retrieval system will be deployed. Other warehouse metadata 38 includes the type of inventory and how it will be stored and retrieved. FIG. 4a depicts a representative warehouse 08 prior to application of the scripting language of the current invention. Illustrated is a generally cuboid interior of a warehouse 08, having a length X, width, Y, and height Z. Although, the illustrated interior is cuboid, it should be understood that the various shaped interiors can be the subject of deployment and, in turn, the warehouse metadata 38. A section or sections of the warehouse 08 are selected for shelving 44 and robot 48 deployment are selected. FIG. 4b depicts a representative warehouse 08 after selection of the deployment region, with the deployment region having a length X2, width, Y2, and height Z2. The dimensions of the selected regions are part of the warehouse metadata 38 employed as a basis for the scripting code. Multiple shelving 44 units are deployed to the warehouse 08. Representative inventory aspects of the warehouse metadata 38 includes the different types of items, the dimensions and geometries of the items, the weights of the items, the durability of the items, and other characteristics.

As previously disclosed, the scripting language framework 36 provides a shelving descriptor 42 and shelving attributes 43 in order to model the shelves 44 of a particular warehouse 08 environment. FIG. 5 shows a hierarchical relationship of a shelving descriptor 42 to a representative subset of shelving attributes 43, while FIGS. 4b-4d depict representative shelving 44 which is modeled using the scripting language framework 36 of the present embodiment.

Figure 4C:
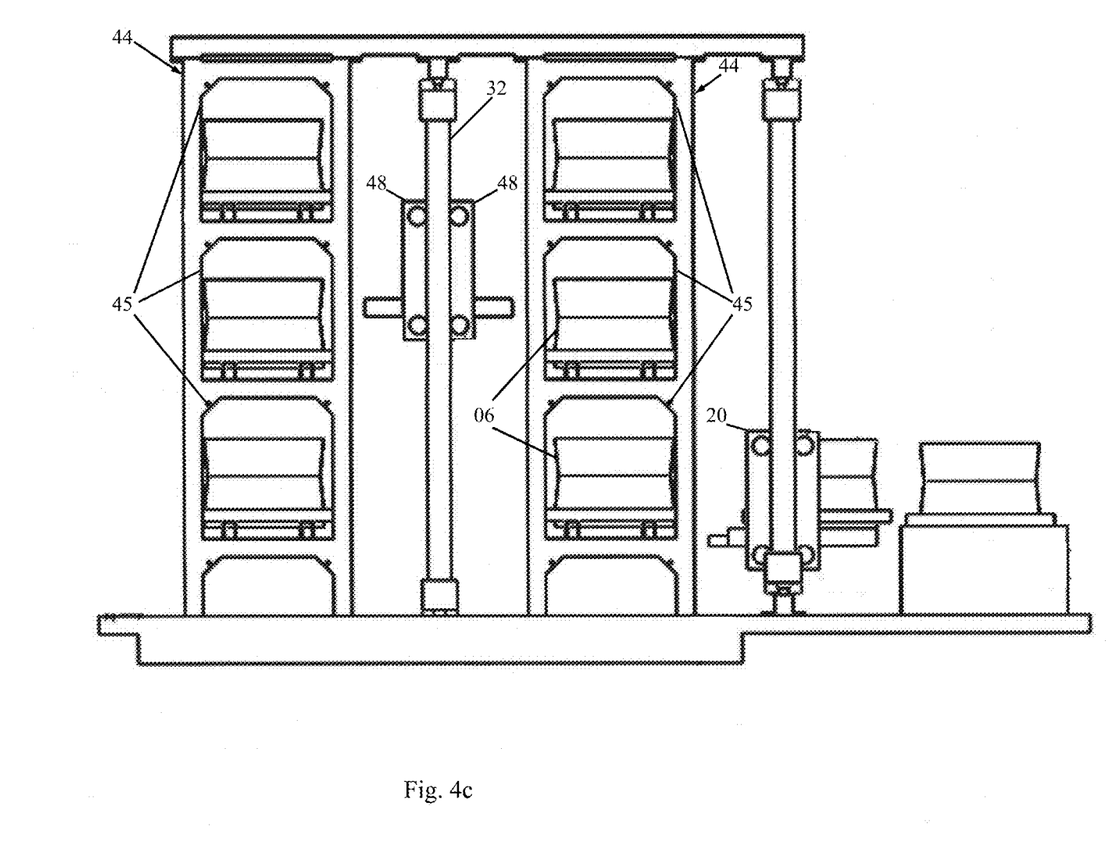
FIG. 4c shows a representative warehouse subsequent to application of the scripting language of the current invention and implementation of shelving and robotic systems.
Figure 4D:
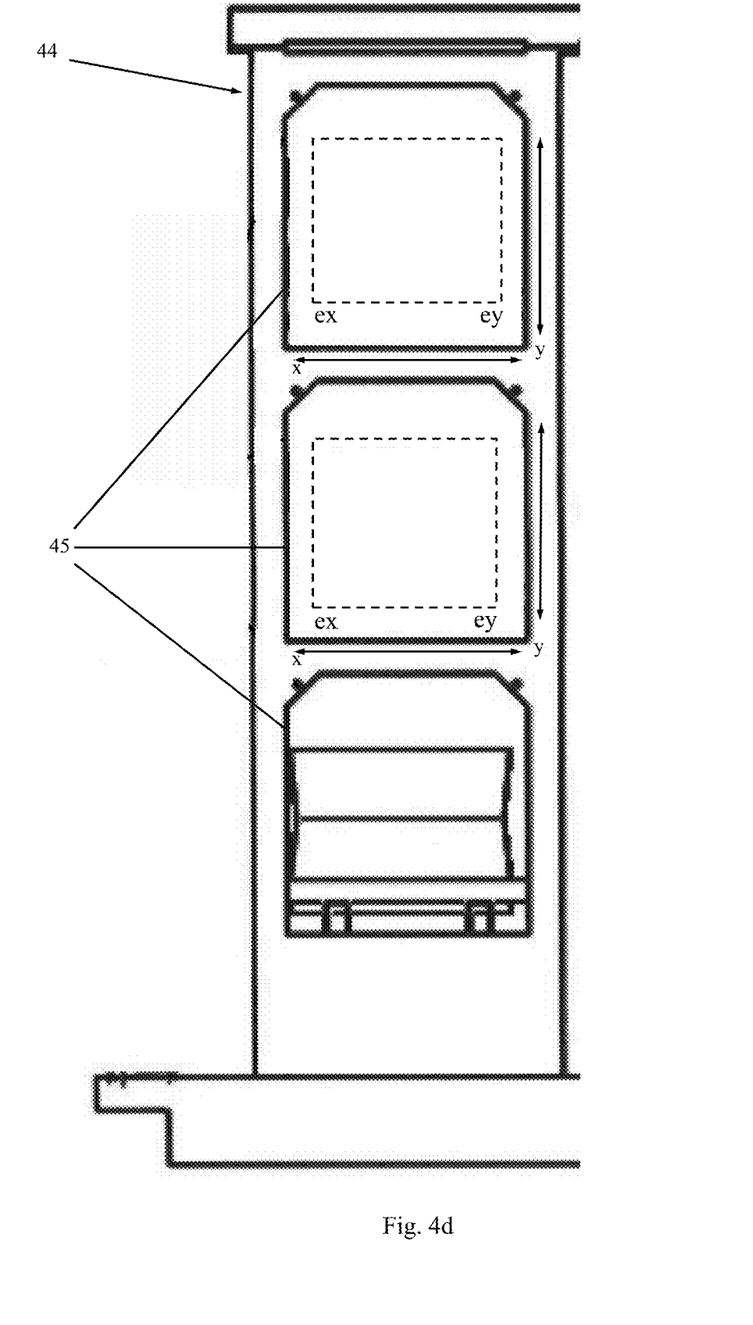
FIG. 4d shows a representative warehouse subsequent to application of the scripting language of the current invention and implementation of shelving and robotic systems.

With reference to FIGS. 4c and 4d, shelving 44 is operable to store inventory, such as pallets, carton, boxes, or the like. Common shelving 44 includes multiple parallel vertical levels having a height y, where may be stored on each vertical level. Each vertical level has a total width x. Each vertical level is further divided horizontally to present a plurality of compartments 45, as shown in FIG. 4c. Each compartment 45 has a width x, height y, and depth. Furthermore, each compartment 45 presents interior offsets for an effective width ex, height ey, and depth, each being slightly less than the width x, height y, and depth, respectively, due to the barriers segmenting the compartments 45.

The scripting language framework 36 provides a shelving descriptor 42, the shelve descriptor 42 modeling shelves 44 deployed in the warehouse 08 environment. Each shelve descriptor 42 instance represents a shelf 44 to be modeled in the warehouse 08 environment. The scripting language framework 36 further provides shelving attributes 43. Representative shelving attributes 43 of the scripting language framework 36 include, but are not limited to, the number of vertical levels, the number of horizontal levels, a compartment identifier, the compartment dimensions, compartment interior dimensions and offsets (ex, ey).

Referring again to FIGS. 4c and 4d, a robot 48 is illustrated for deployment in the warehouse 08 environment. A robot 48 is operable to transport inventory 08 in response to control system 50 signals, facilitating its directed storage and retrieval. The exemplary robotic carriage 48 is associated with one or more shelves 44 and configured to travel in x, y, and z axes along a track system 49 and into the compartments 45, from the shelving 44 to a workstation for further inventory processing. The track system 49 supports and guides the robot 48 within the compartment 45 area of the shelving 44. The illustrated track system is disposed in front of shelving 44 and includes lower and upper tracks. The lower track is laid on ground generally parallel to the lower portion of the shelving rack 12 while the upper track is positioned vertically above lower track and generally parallel to the upper portion of the shelving 44. The robot 48 travels along the track under the influence of a motor in response to the control system 50.

The scripting language framework 36 provides a robot descriptor 46, the robot descriptor 46 modeling a robot 48 deployed in the warehouse 08 environment. Each robot descriptor 46 instance represents a robot 48 to be modeled for deployment in the warehouse 08 environment. The scripting language framework 36 further provides robot attributes 47. The robot attributes 47 include the associate shelving 44 with which it will be paired. Other representative robot attributes 47 of the scripting language framework 36 include, but are not limited to, the x axis minimum position, the x axis maximum position, the y axis minimum position, the y axis maximum position, the z axis minimum position, and the z axis maximum position.

The input scripting language code 40 may be received from the scripting editor 157 after a user has drafted and saved the scripting language code 40. In some instances, a copy of the scripting language code 140 is stored at both the client system and the server 12. Exemplary embodiments of the system 10 include a parser 30 to process the input scripting language code 40. For example, Another Tool for Language Recognition ("ANTLR") is a parser generator tool capable of automatically generating a lexer and parser for different programming languages, defined through an Extended Backus Naur Form ("EBNF") grammar description. ANTLR also offers support for the code-generation phase though its "StringTemplate" mechanism. However, ANTLR allows enriching the EBNF grammar definition with custom code actions, which may be used to perform semantic analysis, triggered through the defined and implemented "parse events."

During lexical analysis, a lexer component is responsible for converting the input sequence characters of the input scripting language code 40 into a sequence of tokens. The lexer component may be internally organized into a scanner and a tokenizer. The resulting tokens are categorized blocks of text, such as symbols, identifiers, operators, delimiters and the language keywords. The tokens may be described by regular expressions that are interpreted by a tool generating the lexer code. In some implementations, during syntactical analysis or parsing phase, a syntax analysis component parses the tokens provided by the lexer, in order to determine the syntactical structure of the source program. The parser may construct a parse tree, such as an Abstract Syntax Tree ("AST"), by transforming the linear input token sequence taken from the lexer into a tree structure according to the rules of a formal grammar description outlining the language's syntax. Syntactical errors may be reported to the user or system in this phase. During a semantic analysis phase, the parser 30 may add semantic information to the parse tree that was produced during the syntactical analysis phase. Also, symbol tables are populated and semantic checks, such as static type checking, are performed, potentially rejecting semantically incorrect input.

In certain instances, the application may be independent of a particular system, language, platform, application, or tool. Accordingly, application may be integrated with other software components from different providers, for example, into a common system. A compiler may translate the input scripting language source code 40. Further, application components may include development artifacts, such as use cases, class diagrams, models, requirements, intermediate-level documentation, executable files, and design documents, for example. In exemplary implementations, the system includes an interpreter or compiler in order to further process the input scripting language code 40 into an object code for use by the control system 50. Using a compiler generator tool such as ANTLR may allow switching of the "target generation language," for example, from PHP to C++. In general, object components may include stand-alone applications, modules, embedded applications, user interfaces, widgets, functions, or any other application or software module. The underlying infrastructure of the object components may support introspection, event-handling, persistence, dynamic linking, and layout management.

In preparation for runtime, databases in memory 16 are initialized and populated. Exemplary databases include a shelving rack table having rows, "slices," or other data structures created to represent the compartments 45. For illustration purposes, FIGS. 4c and 4d includes a grid showing the vertical and horizontal levels. It also shows the width (x) and height (y) of a cartesian coordinate based reference position system. Based on the received shelving configuration, the databases are initialized and pre-populated. Compartment 45 identifiers are assigned, compartment 45 position information is stored, interior compartment offsets information are stored, and compartment 45 dimensions, including depth, are stored.

As illustrated, server 12 may also include a runtime system 32 operable to operate the robotic storage and retrieval system in response to user inventory requests and according to the input scripting language code 40. The server 12 may function as a backend system in connection with one or more client systems to receive user commands for inventory operation commands and operate the robotic storage and retrieval system. For example, a developer at client may use a scripting language editor 34 to input scripting language code 40. An interpreter or compiler may translate the input scripting language code 40 into object code and store the object code in memory 16 on the server 12. Accordingly, the runtime system 32 provides support for the scripting language translation process, allowing a compiler to generate wrapper calls or lower level code, for example. Further, the scripting language framework 36 may provide access into a number of different execution environments for the input scripting language code 40.

In exemplary configuration, the runtime system 32 is communicatively interposed between the input scripting language code 40 or its object code and the control system 50. The runtime system 32 operates the control system 50 for the robotic storage and retrieval system. A control system 50 includes a control server and control interface and is operable to issue control signals to and receive signal output, such as status or response codes, from the robotic storage and retrieval system. The control system 50 issues control signals and receive signal output from communication with the robot 48 of the storage and retrieval system over a communication link. The communication link may be a wireless link such as simplex radio frequency or 802.11, a wired link such as electrical cable or fiber optic cable, or other suitable link. In operation, the control system 50 issues control signals to a robot 48 in order to transport inventory 06 in response to user inventory operation requests and according to the input scripting language code 40. Representative inventory operation commands include commands to retrieve inventory 06 from storage and to deposit inventory 06 into storage. The control system 50 issues commands for the robot 48 to travel in the x, y, and/or z axes, in typical configuration, along a track system, from the shelving 44 to a workstation proximate the shelving 44. The track system supports and facilitates the travel of the robot 48 to and from a compartment 45 of a shelving rack 44. The illustrated track system is disposed in front of shelving 44 and includes lower and upper tracks. The lower track is laid on ground generally parallel to the lower portion of the shelving rack while the upper track is positioned vertically above lower track and generally parallel to the upper portion of the shelving 44.

Figure 3:
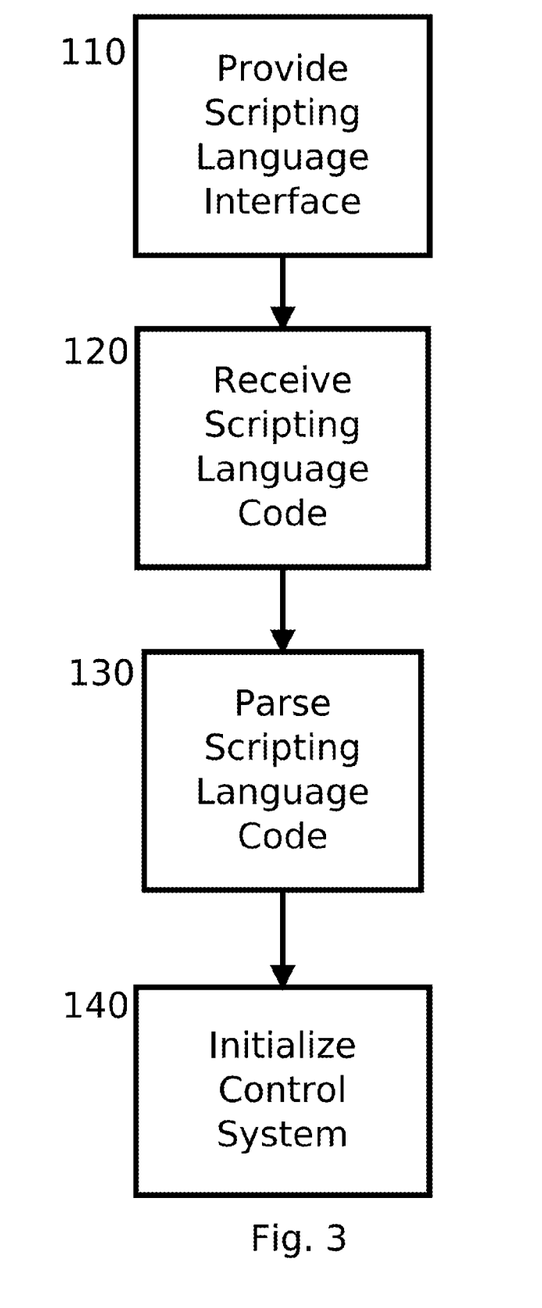
FIG. 3 shows a flowchart of a process according to the current invention.

FIG. 3 depicts an exemplary process of providing a scripting language for robotic storage and retrieval design for warehouses. A scripting language editor is provided to the user for input 110. The system receives the input scripting language code 120. The system parses the input scripting language code 130. The control system is initialized and operated according to the input scripting language code 140. More consideration will be given to each of the steps below.

Figure 6:
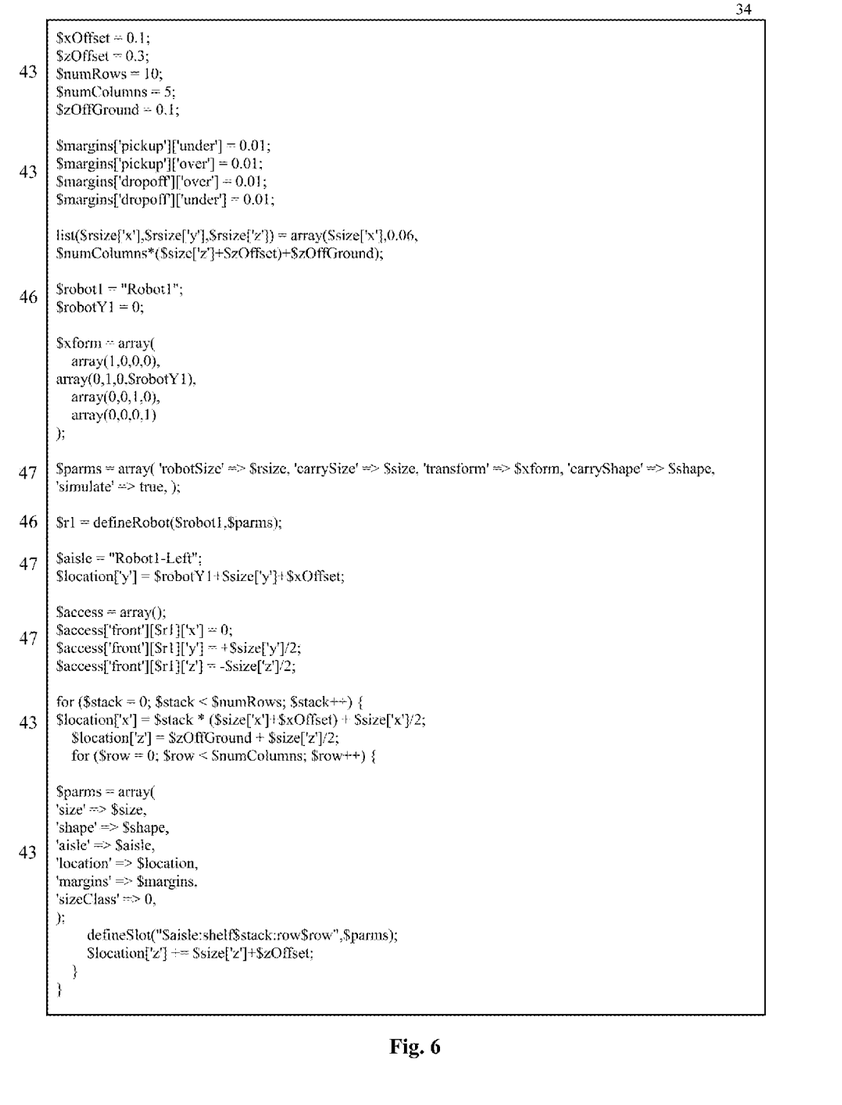
FIG. 6 shows representative scripting code employed in an embodiment of the scripting language of the current invention.

In preparation, a user of the system 10 determines the warehouse metadata 38 for which the robotic storage and retrieval system will be deployed. The user retrieves the pre-deployment dimensions of the warehouse 08 and the dimensions of the region(s) in which the shelving 44 will be positioned and where the robots 48 will travel, as illustrated in FIGS. 4a and 4b. The user further retrieves the number of shelving 44 levels, number of shelving 44 columns, compartments 45 dimensions and offsets, as shown in FIGS. 4c and 4d. The user further retrieves the inventory characteristics, such as the different types of items, the dimensions and geometries of the items, the weights of the items, the durability of the items, and other characteristics. The system 10 provides a scripting language interface 34 for user input 110. A scripting language framework 36 is provided, with a representative scripting language framework 36 depicted in FIG. 5. The user inputs scripting code 40 based on the warehouse metadata 38 and according to the scripting language framework 36. More specifically, the user inputs shelving descriptors 42 corresponding to shelving 44. The user then inputs shelving attributes 43 corresponding to the levels, columns, compartments, and compartment dimensions. The user inputs robot descriptors 46 corresponding to robots 48. The user then inputs robot attributes 47 corresponding to the associated shelving 44, track 32 minimum height position, track 32 maximum height position, track 32 minimum width position, track 32 maximum width position, compartment 45 entry position, and compartment 45 maximum depth position. Representative input scripting code 40 is shown in FIG. 6. The input scripting code 40 is received by the system 120. The input scripting code 40 is parsed by the system and interpreted or compiled 130. The control system 50 is initialized 140. The user then issues inventory operation commands to the robotic storage and retrieval system where the system 10 issues commands to the control system to carry out the command in accordance with the input scripting code 40.

In certain embodiments, the system and processes facilitate simulation of the robotic storage and retrieval system. The system and processes simulate operation of the robotic storage and retrieval system for the particular warehouse and employing the input scripting code 40. Based on the warehouse metadata 38, an operational visual likeness of the warehouse is created and visual operation of the robotic storage and retrieval system, according to the input scripting code 40, is rendered for simulation of operation whereby a user may observe operation of the design, observe undesirable operation, and reiterate based on different warehouse metadata 38 or input scripting code 40. A shelving configuration and corresponding track and robot designs are retrieved. The databases are initialized and pre-populated. The warehouse environment is rendered and inventory operations are simulated.

Initially, a shelving 44 configuration is retrieved. A particular warehouse 08 will have a need for a number of units of storage for a particular location. Accordingly, it will deploy a selected number of shelves 44 having a selected number of vertical levels, a selected number of horizontal columns, and a compartment volume. Corresponding track systems 49 and robot 48 design is retrieved. FIGS. 4a-4d. depict representative shelving 44 configuration, track system 49, and robot 48. Based on the received shelving 44 configuration, the databases are initialized and pre-populated. Compartment 45 identifiers are assigned, compartment 45 position information is stored, interior compartment 45 position information is stored, and compartment 45 dimensions, including depth, are stored. The paired track system 49 enabling robot 48 travel path over the x,y plane presented by the shelving rack configuration is setup. The outer bounds of the travel path are stored and the robot 48 is calibrated to the travel ranges. Next, sample inventory table is created.

Figure 7:
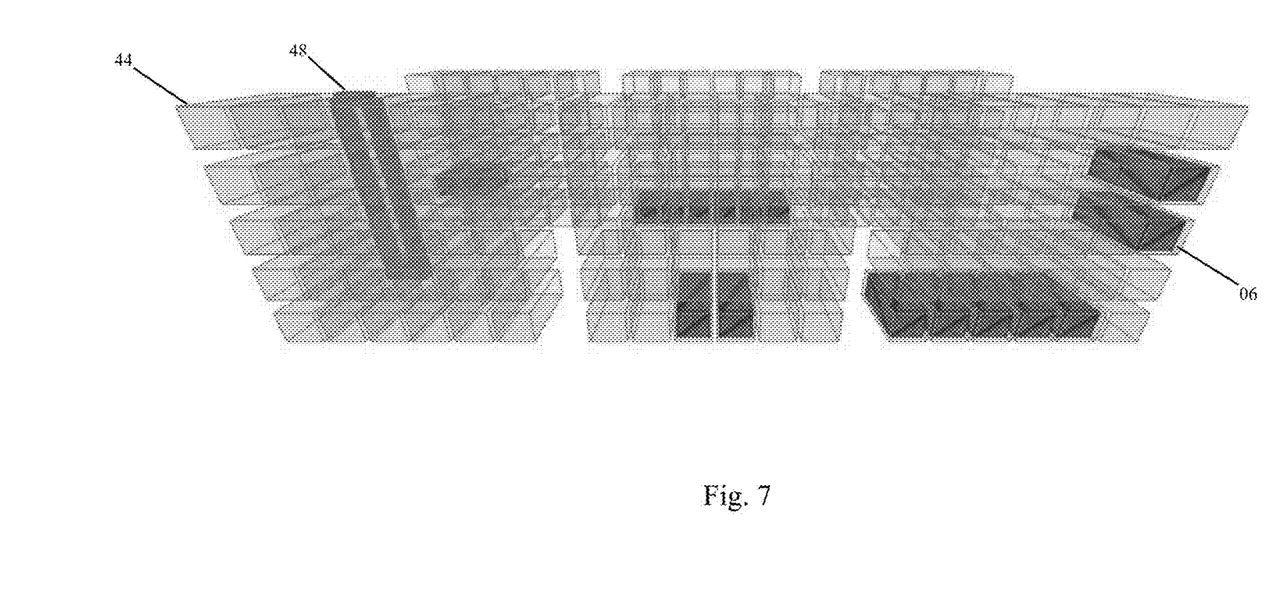
FIG. 7 shows a representative state of simulation of a shelving and robotic system in a warehouse environment.

Inventory operations such as storage and retrieval are simulated by the system. A user or job queue is employed as the basis for moving inventory. The system renders a likeness of the shelving rack based on the sample inventory, retrieves the shelving 44 configuration from the database. FIG. 7 depicts a representative likeness. Based on the retrieved data, the system renders a scaled, spatially accurate, model of the shelving 44. The model displays a representation of each compartment 45 of the shelving 44 in its proper relative orientation with optional varying indicia for compartment 45 status such as inventory type, inventory category, inventory volume, compartment occupancy, and the like. As shown, the likeness may be depicted in the form of a near three dimensional model from a front and side perspective, respectively. Alternatively, a two dimensional model may be shown.

The inventory operation is shown to the system user. For example, where the inventory operation is to store inventory 06, the travel path of the robot 48 may be from one compartment 45 to another compartment 45. The system user may observe operation of the design and operation simulation, observe undesirable operation, and then reiterate based on different warehouse metadata 38 or input scripting code 40. Additional disclosure of simulation is included in U.S. patent application Ser. No. 14/247,172 to Blumenau, which is hereby incorporated by reference.

While the foregoing detailed description has disclosed several embodiments of the invention, it is to be understood that the above description is illustrative only and not limiting of the disclosed invention. It will be appreciated that the discussed embodiments and other unmentioned embodiments may be within the scope of the invention.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for scripting language for design and operation of a robotic storage and retrieval system in a warehouse, said system comprising:
   processor and memory operable to provide;
   a scripting language framework for directed operation of a control system of said robotic storage and retrieval system, said scripting language framework providing a shelving descriptor and a robot descriptor;
   said shelving descriptor operable to model a shelving to be deployed in said warehouse, said shelving descriptor further having associated shelving attributes defining properties of said shelving descriptor;
   said robot descriptor operable to model a robot to be deployed in said warehouse, said robot descriptor further having associated robot attributes defining properties of said robot descriptor;
   a scripting editor comprising a user interface operable to receive input scripting language code conforming to said scripting language framework and based on warehouse metadata;
   a parser operable to interpret or compile said input scripting language code into a runtime system;
   said runtime system configured to issue control operations to a robot in said warehouse and communicatively interposed between said robot and a control system of said robotic storage and retrieval system.

2. The system of claim 1, wherein said input is interpreted for said runtime system.

3. The system of claim 1, wherein said input is compiled to object code for said runtime system.

4. The system of claim 1, wherein said warehouse metadata includes height, weight, depth information for one or more regions of a warehouse.

5. The system of claim 1, wherein said warehouse metadata is selected from the following: inventory type, inventory dimensions, inventory durability, inventory quantity.

6. The system of claim 1, wherein said scripting shelving attributes are selected from the following: number of levels, number of columns, column width, column height, and orientation.

7. The system of claim 1, wherein said scripting shelving attributes are selected from the following: compartment identifier, compartment position, compartment dimensions, and compartment interior offsets.

8. The system of claim 1, wherein said scripting robot attributes include associated shelving.

9. The system of claim 1, wherein said scripting robot attributes are selected from the following: x axis minimum, x axis maximum, y axis minimum, y axis maximum, z axis minimum, z axis maximum, and orientation.

10. The system of claim 1, wherein said scripting shelving attributes are selected from the following: compartment identifier, compartment position, compartment dimensions, and compartment interior offsets; and
   said scripting robot attributes are selected from the following: associated shelving, x axis minimum, x axis maximum, y axis minimum, y axis maximum, z axis minimum, and z axis maximum.

11. A process carried out on one or more processors for design and operation of a robotic storage and retrieval system in a warehouse, said process comprising:
   providing a scripting language framework for directed operation of a control system of said robotic storage and retrieval system, said scripting language framework providing a shelving descriptor and a robot descriptor;

said shelving descriptor operable to model a shelving to be deployed in said warehouse, said shelving descriptor further having associated shelving attributes defining properties of said shelving descriptor;

said robot descriptor operable to model a robot to be deployed in said warehouse, said robot descriptor further having associated robot attributes defining properties of said robot descriptor;

providing a scripting editor comprising a user interface operable to receive input scripting language code conforming to said scripting language framework and based on warehouse metadata;

providing a parser operable to interpret or compile said input scripting language code into a runtime system;

communicately interposing said runtime system between said robot and a control system of said robotic storage and retrieval system, said runtime system configured to issue control operations to a robot in said warehouse and communicatively interposed.

12. The process of claim 11, wherein said warehouse metadata includes height, weight, depth information for one or more regions of a warehouse.

13. The process of claim 11, wherein said warehouse metadata is selected from the following: inventory type, inventory dimensions, inventory durability, and inventory quantity.

14. The process of claim 11, wherein said scripting shelving attributes are selected from the following: number of levels, number of columns, column width, column height, and orientation.

15. The process of claim 11, wherein said scripting shelving attributes are selected from the following: compartment identifier, compartment position, compartment dimensions, and compartment interior offsets.

16. The process of claim 11, wherein said scripting robot attributes are selected from the following: x axis minimum, x axis maximum, y axis minimum, y axis maximum, z axis minimum, z axis maximum, and orientation.

17. The process of claim 11, wherein said scripting shelving attributes are selected from the following: compartment identifier, compartment position, compartment dimensions, and compartment interior offsets; and said scripting robot attributes are selected from the following: associated shelving, x axis minimum, x axis maximum, y axis minimum, y axis maximum, z axis minimum, z axis maximum, and orientation.

18. A computer program product encoded on a non-transitory, tangible storage medium, the product comprising computer readable instructions for causing one or more processors to perform operations comprising design and operation of a robotic storage and retrieval system in a warehouse, said system comprising:

providing a scripting language framework for directed operation of a control system of said robotic storage and retrieval system, said scripting language framework providing a shelving descriptor and a robot descriptor;

said shelving descriptor operable to model a shelving to be deployed in said warehouse, said shelving descriptor further having associated shelving attributes defining properties of said shelving descriptor;

said robot descriptor operable to model a robot to be deployed in said warehouse, said robot descriptor further having associated robot attributes defining properties of said robot descriptor;

providing a scripting editor comprising a user interface operable to receive input scripting language code conforming to said scripting language framework and based on warehouse metadata;

providing a parser operable to interpret or compile said input scripting language code into a runtime system;

communicately interposing said runtime system between said robot and a control system of said robotic storage and retrieval system, said runtime system configured to issue control operations to a robot in said warehouse and communicatively interposed.

19. The computer program product of claim 18, wherein said scripting shelving attributes are selected from the following: compartment identifier, compartment position, compartment dimensions, and compartment interior offsets.

20. The computer program product of claim 18, wherein said scripting robot attributes are selected from the following: x axis minimum, x axis maximum, y axis minimum, y axis maximum, z axis minimum, z axis maximum, and orientation.

* * * * *